Nov. 21, 1950          G. A. TINNERMAN          2,530,554
ROD JOINT OR CONNECTION
Filed April 19, 1949          2 Sheets-Sheet 1
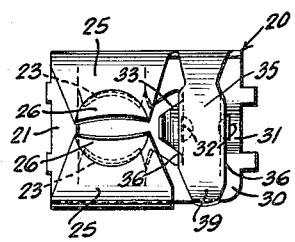
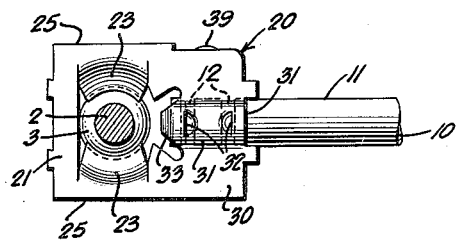
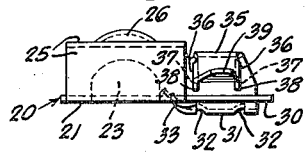
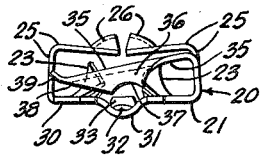
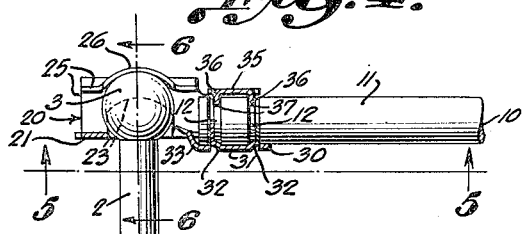
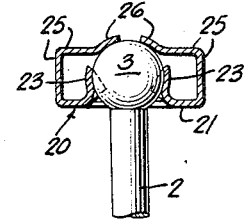
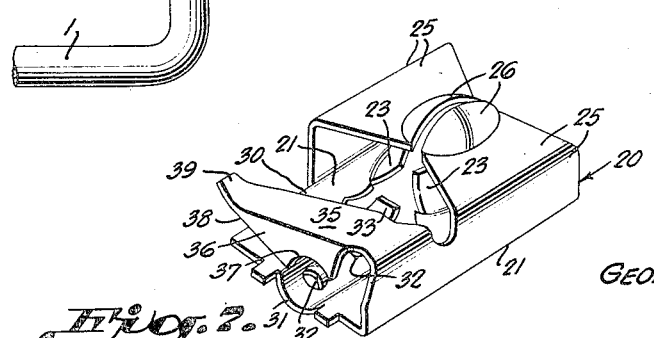
Inventor
GEORGE A. TINNERMAN
By H. G. Lombard
ATTORNEY Nov. 21, 1950 G. A. TINNERMAN 2,530,554
ROD JOINT OR CONNECTION
Filed April 19, 1949 2 Sheets-Sheet 2
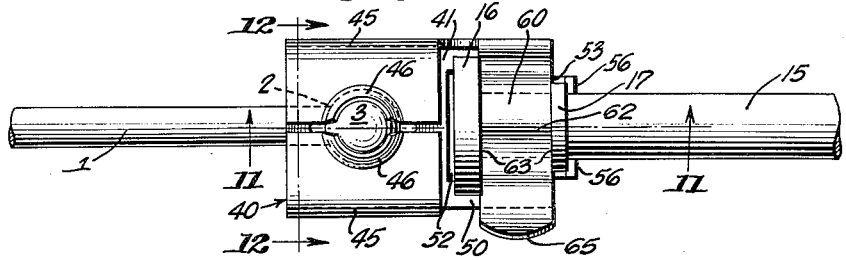
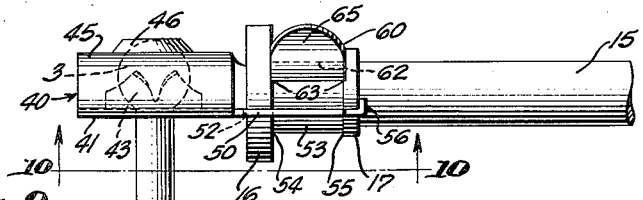
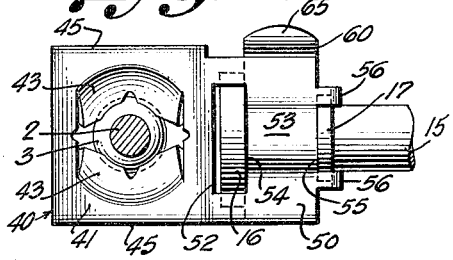
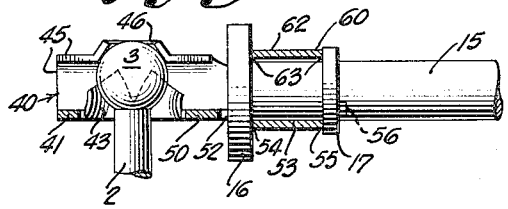
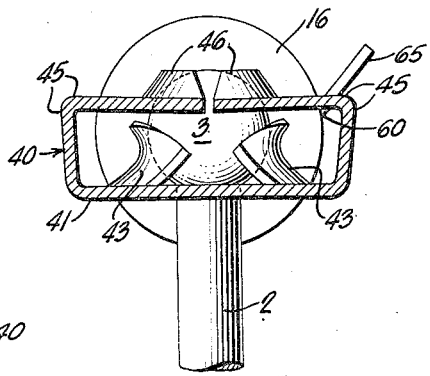
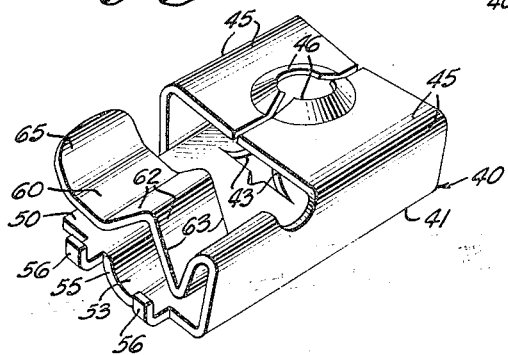
INVENTOR.
GEORGE A. TINNERMAN
BY
H. G. Lombard
ATTORNEY Patented Nov. 21, 1950

2,530,554

UNITED STATES PATENT OFFICE 2,530,554

ROD JOINT OR CONNECTION

George A. Tinnerman, Cleveland, Ohio, assignor to Tinnerman Products, Inc., Cleveland, Ohio, a corporation of Ohio Application April 19, 1949, Serial No. 88,469

11 Claims. (Cl. 287—90)

This invention relates in general to improvements in rod joints and connections and is directed, more particularly, to a rod joint or connection in which the respective parts are easily and quickly assembled in detachable relation and adapted for limited relative movement in the manner of a universal joint.

The invention has a wide range and variety of applications and uses and is particularly useful in automobile installations in connection with a choke control for a carburetor, or in any similar apparatus or mechanism in which a control member is connected to an operating lever in a manner whereby movement imparted to the control member is transmitted to the operating lever for actuating the apparatus or mechanism.

The various objects and advantages of the invention and the new and useful features in the construction and arrangement of the parts thereof will be readily apparent as the following description proceeds with reference to the accompanying drawings, for purposes of illustration but not of limitation, in which like reference characters designate like parts throughout, and in which:

Fig. 1 is a top plan view of a preferred form of fastener or connecting device for providing the improved rod joint or connection in accordance with the invention;

Fig. 2 is a side elevational view of the fastener or connecting device shown in Fig. 1;

Fig. 3 is an end elevational view of the connecting device as seen from the right of Fig. 2;

Fig. 4 is a side view of a completed joint or connection in accordance with the invention, with the connecting device shown in section;

Fig. 5 is a sectional view along line 5—5 of Fig. 4, looking in the direction of the arrows, and showing the fastener or connecting device in bottom plan;

Fig. 6 is a sectional view along line 6—6 of Fig. 4, looking in the direction of the arrows; and, Fig. 7 is a perspective view of the fastener or connecting device per se.

Fig. 8 is a top plan view of a rod joint or connection as provided in another form of the invention;

Fig. 9 is a side elevational view of the joint or connection shown in Fig. 8;

Fig. 10 is a sectional view along line 10—10 of Fig. 9 showing this form of the fastener or connecting device in bottom plan;

Fig. 11 is a sectional view along line 11—11 of Fig. 8;

Fig. 12 is a sectional view along line 12—12 of Fig. 8 on an enlarged scale; and Fig. 13 is a perspective view of the fastener or connecting device per se shown in Figs. 8 to 12 inclusive.

Referring now, more particularly, to the drawings, Figs. 1 to 7 inclusive show a preferred form of the invention in which a pair of rod members, or the like such as ,an operating lever member 1 and a control rod 10 for imparting movement to said operating lever, are coupled in a connection operating substantially in the manner of a universal joint. The control rod 10 may be provided in any suitable manner in association with a cable, shaft, crank or other means for actuating an instrument or mechanism with which the joint or connection is intended to be be used. The lever operating member 1 may assume any suitable form or shape as provided in connection with or as a part of an instrument or apparatus which is actuated thereby, and a preferred arrangement comprises a stud portion 2 having a ball head 3. The control member 10, includes a simple shaft or rod end portion 11 having a pair of spaced annular grooves 12 for a purpose presently to be described. By way of an example of one application of the invention, the connection has been found particularly suitable for use in conjunction with the choke mechanism of an automobile in an arrangement in which the operating lever 1 of the carburetor is connected to the rod end 11 of the control member 10 such as a cable or rod, or the like. By means of the fastener or connecting device of the present invention, the ends of the rod members 1, 10, respectively, may be easily and quickly assembled and securely connected together in such a way that any control movement imparted to the control member 10 is transmitted to the operating lever 1 for actuating the choke or other mechanism or apparatus.

The fastener or connecting device, designated generally 20, for providing such a rod joint or connection is a simple, inexpensive sheet metal device which is readily provided from any suitable sheet metal, preferably spring steel or cold rolled steel having spring like characteristics. The sheet metal blank for the fastener or connecting device 20 is so provided as to define an overall base which comprises a ball socket area 21 formed from one portion thereof and adapted for snap fastening engagement with the ball head 3 on the operating lever 1, while an adjoining area 30 of said base comprises a clip or clasp type of fastening means for securing the end of the control rod 10 in operative relation thereto.

The ball socket area 21 of the fastener base comprises a pair of resilient tongues 23 provided from the material of said base by a pair of spaced parallel slits on opposite sides of a central opening between the extremities of said tongues. Said tongues 23 are bent to extend upwardly out of the plane of the base portion 21 to define an opening therebetween for the passage of the ball head 3 of the operating lever 1 and otherwise are suitably curved or dished into outwardly concaved surfaces corresponding to the contour of the ball 3. The arrangement preferably is such that said tongues 23 define a resilient socket comprising a pair of spaced opposite spherical-shaped elements, Fig. 6, adapted to snap into frictional gripping engagement with opposite side portions of the ball 3 to retain the ball between said tongues but capable of limited lateral movement in any direction. The opposite sides of the base portion 21 are provided with return bent flanges 25 having their extremities formed into concave cap portions 26 also corresponding to the contour of the ball end 3 and adapted to engage the top of said ball to retain the same in connected relation between the spherical-shaped tongue elements 23.

The adjoining base portion 30 of the fastener is constructed for connection to the other rod end 11 and is formed with an outwardly curved lower bearing surface 31 on which the lower side of said rod end 11 is seated. This lower bearing surface 31 is provided with a pair of inwardly projecting detents or shoulders 32 suitably spaced for engaging the outer walls of the annular grooves 12 in said rod end 11. Preferably said shoulders 32 are provided by a pair of spaced parallel slits with the metal adjoining said slits bent inwardly so that the slit edge portions define the spaced shoulders substantially as shown in Figs. 3, 4 and 5; also an auxiliary shoulder 33 preferably is provided by a tab on the end of the base portion 30 and the same bent upwardly in position to engage the extremity of the rod end 11, as shown in Fig. 4.

A return bent spring arm 35 is provided at one side of said base portion 30 and defines an upper bearing surface cooperating with the lower bearing surface 31 to retain the rod end 11 therebetween. This return bent arm 35 is provided in a generally channel-shaped form to include a pair of spaced downwardly extending rib sections 36 having a spacing corresponding to the spacing of the annular grooves 12 in the rod end 11. The edges of said rib section 36 are so stamped as to provide curved portions 37 conforming to the contour of said annular grooves 12 in the rod end 11, together with inclined guide edges 38 tapering outwardly toward the free end 39 of said spring arm 35. Preferably said free end 39 of the spring arm is provided in the form of an outwardly flared lip which facilitates the initial step in applying the rod end 11 of assembled relation with the connecting device and otherwise permits said spring arm 35 to be readily manipulated whenever it is desired to disconnect said rod end from such assembled relation. The curved edge portions 37 of said rib sections thus define a pair of spaced upper jaws or shoulders which are received in the spaced annular grooves 12 of the rod end 11 and cooperate with the spaced lower shoulders 32 in locking said rod end against axial displacement in connected relation between the lower bearing surface 31 and the upper bearing surface provided by said spring arm 35, as aforesaid.

In the use of the invention, it will be understood that the assembly of the fastener or connecting device 20 with the rod ends 2 and 11, respectively, involves a relatively simple procedure which may be readily effected without the use of special tools and in a minimum of time and effort. The rod end 2 is easily and quickly secured to the connecting device by a simple push thereon as necessary to position the ball head 3 in the socket defined by the resilient tongues 23 and cap portions 26 in the manner of a snap fastener. The arrangement is such that the ball 3 is adapted to spread said tongues 23 apart as necessary for the opposite sides of said ball to pass therebetween whereupon the spherical-shaped surfaces of said tongues 23 snap into snug, frictional and gripping engagement with opposite sides of said ball 3. In this relation, the concave cap portions 26 on the extremities of the return bent flanges 25 engage the top of the ball 3 to seat the same in operative position between said tongues 23 but capable of limited movement laterally in any direction.

The other rod end 11 is also secured to the fastener or connecting device in a quick and easy manner simply by arranging said rod 11 at right angles to the spring arm 35 of the connecting device with the grooved portion thereof in position to pass between the outwardly flared extremity 39 of said spring arm and the adjacent area of the base portion 30, Fig. 3. In this position, the annular grooves 12 in said rod end are aligned with the inclined guide edges 38 on the rib sections 36 carried by said spring arm and also the shoulders 32 on the base portion 30. Accordingly, when the rod end 11 is pushed transversely of the fastener, it engages under the outwardly flared extremity 39 of the spring arm 35 to spread the same from the base portion 30 as necessary to permit the spaced inclined guide edges 38 carried by said spring arm to enter the spaced annular grooves 12 in said rod end. The inclined guide edges 38 thus ride in the annular grooves 12 to cause a further spreading of the spring arm 35 from the base 30 as necessary for said grooved portion of the rod to snap under the curved jaws or shoulders 37 on the spring arm 35 and otherwise seat on the curved lower bearing surface 31 on the base portion 30. In this relation, the spaced detents or shoulders 32 adjacent said lower bearing surface 31 are also received in the spaced annular grooves 12 with the shoulder defined by the tab 33 engaging the extremity of the rod end 11, as shown in Fig. 4. These shoulders thus cooperate with the jaws or shoulders 37 on the spring arm 35 to lock the rod end 11 in operative position between the lower bearing surface 31 and the upper bearing surface defined by said spring arm 35.

The rod ends 2 and 11, respectively, are thus coupled together by the fastener or connecting device 20 in a manner whereby a movement of the control rod 11 transmits a corresponding motion to the lever or other operating member 1. Likewise, the connected rod members may just as well be employed in a reverse relation whereby a movement to the rod member 1 is transmitted to the rod member 11.

The rod members 2 and 11 are secured to the fastener or connecting device 20 separately and independently in the manner described and accordingly, either rod member may be attached to the connecting device prior to the other. Likewise, either rod member may be readily detached from the connecting device without disturbing the other and the same separated from the connecting device in more or less a reversal of the foregoing described assembling procedure. Thus, the rod member 2 may be readily detached by a simple pull as necessary to withdraw the ball head 3 from between the resilient tongues 23. The rod member 11 may be easily and quickly detached simply by pushing the same transversely of the fastener as necessary to slip out of engagement with the shoulders or jaws 37 carried by the spring arm 35, this operation being facilitated by raising the spring arm 35 by the lip 39 on the extremity thereof.

Figs. 8 to 13 inclusive disclose another form of the invention in which the control rod end 15 is provided in an alternate construction with an annular grooved portion defining a pair of spaced collars 16, 17, which present spaced walls similar to the walls provided by the spaced annular grooves 12 in the rod 10 of Figs. 1–7 for securing the spring arm portion of the fastener or connecting device thereto. The operating lever or rod member 1 is of a similar character comprising a stud portion 2 carrying a ball head 3.

The fastener or connecting device 40 is provided in a generally similar construction with a base portion 41 comprising a socket for securing the ball head 3 of rod end 2, and an adjoining base portion 50 comprising a spring arm for securing the rod end 15. The base portion 41 is provided with a pair of resilient tongues 43 stamped therefrom and bent upwardly for engaging opposite sides of the ball head 3 as shown in Fig. 12. The tongues 43 are formed with curved, V-notched extremities to provide for increased resilience therein and the concave cap portions 46 on the extremities of the return bent flanges 45 are provided in a cone-shaped form for engaging the top of said ball head 3, as shown in Figs 11 and 12.

The adjoining base portion 50 is provided with a transverse slot 52 and an adjacent outwardly curved lower bearing surface 53 having a width slightly less than the space between the walls defined by the spaced collars 16, 17, on the rod end 15. As illustrated in Fig. 10, the slot 52 is adapted to receive the collar 16 in engagement with the inner edge 54 of the bearing surface 53 while the collar 17 engages the outer edge 55 of said bearing surface. The edges 54, 55, on opposite sides of said bearing surface 53, accordingly, form shoulders adapted for abutting engagement with the spaced walls defined by the collars 16, 17 respectively. Additional shoulders 56 are provided for engagement with the outer wall of the collar 17, preferably by means of inintegral projections having upwardly bent extremities defining said shoulders 56.

A return bent spring arm 60 extending from one side of said base portion 50 is provided in a width corresponding to the spacing between the walls of the collars 16, 17, and is formed with an upwardly arched or curved bent portion 62 defining an upper bearing surface for engaging the rod end 15 between said collars 16, 17. The edges of said spring arm 60, accordingly, define spaced transverse shoulders 63 for engaging the spaced walls of said collars 16, 17, while the extremity of said spring arm 60 is bent into an outwardly flared lip 65 for facilitating the application of said spring arm to connected relation with the rod end 15 between said collars 16, 17.

The fastener or connecting device 40, thus provided, is adapted to be secured to the respective rod members 2 and 15 to provide a joint or connection in the same general manner and for the same use as that described with reference to Figs. 1–7 inclusive. The ball head 3 on the rod end 2 is secured in the socket defined by the spring tongues 43 and the cap portions 46 by a similar snap fastening action, while the rod end 15 is positioned adjacent the flared lip 65 of the spring arm 60 with said spring arm in line with the space between the spaced collars 16, 17. The rod end 15 is then slipped transversely under said spring arm 60 to a position in which the upper bearing surface 62 of said spring arm clasps the upper side of rod end 15 between the spaced collars 16, 17, as shown in Figs. 8 and 9, with the edges of said spring arm 60 engaging the spaced walls defined by said collars 16, 17, to lock the rod end 15 against axial displacement. In this position, the lower side of the rod end 15 is seated on the lower bearing surface 53 with the collar 16 received in the transverse slot 52 at the inner edge 54 of said bearing surface 53 and the collar 17 disposed at the outer edge 55 thereof. Accordingly, the edges 54, 55, on opposite sides of said lower bearing surface 53 serve as spaced shoulders in engagement with the adjacent spaced walls of the collars 16, 17, to lock the lower side of the rod end 15 against axial displacement in cooperation with spring arm 60 engaging the upper side of said rod end, as aforesaid. In addition, the shoulders 56 are positioned in engagement with the outer wall of collar 17 as seen in Figs. 8 and 9 to increase the strength and rigidity of the connection thus provided. The completed joint or connection in this form of the invention, accordingly, is of the same general character as that described with reference to Figs. 1–7 inclusive and is generally similar thereto in operation and use and in the attachment and/or detachment of the component parts thereof.

The fastener or connecting device in any form preferably is constructed of relatively thin sheet metal the thickness of which is selected according to service requirements and the predetermined size of the rod end members to be secured in connected relation. The connecting device is most effective when provided of spring metal suitably spring tempered and otherwise treated to give the desired toughness and hardness, particularly in the case of devices which are subject to constant usage in heavy duty applications. A cheap and highly effective connecting device may be provided from cold rolled metal such as cold rolled steel which is untempered but of a spring metal nature and capable of providing an effective and reliable connecting device as and for the purposes described.

While the invention has been described in detail with specific examples, such examples are intended as illustrations only inasmuch as various changes may be resorted to without departing from the spirit and scope of the invention.

What is claimed is:

1. A connection comprising a pair of members, one of said members having a ball head, and a device connecting said members comprising a sheet metal body bent to provide a base having a socket portion comprising a pair of resilient tongues pressed out of the material of said base and disposed in gripping engagement with said ball head, and another portion of said base adjoining said socket portion having a spring arm securing the other member of the connection.

2. A connection comprising a pair of members, one of said members having a ball head, and a device connecting said members comprising a sheet metal body bent to provide a base having a socket portion comprising a pair of resilient tongues pressed out of the material of said base and disposed in gripping engagement with the sides of said ball head and a flange engaging the top of said ball head, and another portion of said base adjoining said socket portion having a spring arm securing the other member of the connection.

3. A connection comprising a first member having a ball head, a second member having a transverse wall thereon, and a connecting device comprising a sheet metal body bent to provide a base portion having a socket comprising a pair of resilient tongues in engagement with said ball head, and another base portion having a spring arm cooperating therewith to clasp said second member in secured relation and a shoulder in abutting relation to said transverse wall on said second member.

4. A connection comprising a first member having a ball head, a second member having a transverse wall thereon, and a connecting device comprising a sheet metal body bent to provide a base portion having a socket comprising a pair of resilient tongues in engagement with said ball head, another base portion having a spring arm cooperating therewith to clasp said second member in secured relation and a shoulder in abutting relation to said transverse wall on said second member, and a shoulder on said spring arm also in abutting relation to said transverse wall on said second member.

5. A connection comprising a first member having a ball head, a second member having a pair of spaced transverse walls thereon, and a connecting device comprising a sheet metal body bent to provide a base portion having a socket comprising a pair of resilient tongues in engagement with the sides of said ball head and a flange engaging the top of said ball head, and another base portion having a spring arm cooperating therewith to clasp said second member in secured relation and a pair of shoulders in abutting relation to said spaced transverse walls on said second member.

6. A connection comprising a first member having a ball head, a second member having a pair of spaced transverse walls thereon, and a connecting device comprising a sheet metal body bent to provide a base portion having a socket comprising a pair of resilient tongues in engagement with the sides of said ball head and a flange engaging the top of said ball head, another base portion having a spring arm cooperating therewith to clasp said second member in secured relation, a pair of shoulders in abutting relation to said spaced transverse walls on said second member, and a pair of spaced shoulders on said spring arm also in abutting relation to said spaced transverse walls on said second member.

7. A connection comprising a first member and a second member provided with a transverse wall thereon, and a connecting device comprising a sheet metal body bent to provide a base portion having a socket secured to said first member and another base portion having a spring arm cooperating therewith to secure said second member and a shoulder in abutting relation with said transverse wall on said second member, and a shoulder on said spring arm in abutting relation with said transverse wall on said second member.

8. A connection comprising a first member and a second member provided with a pair of spaced transverse walls thereon, and a connecting device comprising a sheet metal body bent to provide a base portion having a socket secured to said first member and another base portion having a spring arm cooperating therewith to clasp said second member in secured relation, said spring arm defining a pair of spaced shoulders in abutting relation with said spaced transverse walls on said second member.

9. A connection comprising a first member and a second member provided with a pair of spaced transverse walls thereon, and a connecting device comprising a sheet metal body bent to provide a base portion having a socket secured to said first member and another base portion having a spring arm cooperating therewith to clasp said second member and a pair of spaced shoulders in abutting relation with said spaced transverse walls on said second member, said spring arm also defining means in abutting relation with said spaced transverse walls on said second member.

10. A connection comprising a first member and a second member provided with a pair of spaced transverse walls thereon, and a connecting device comprising a sheet metal body bent to provide a base portion having a socket secured to said first member and another base portion having a spring arm cooperating therewith to clasp said second member in secured relation and a pair of spaced shoulders in abutting relation with said spaced transverse walls on said second member, said spring arm also having a pair of spaced shoulders in abutting relation with said spaced transverse walls on said second member.

11. A connecting device comprising a sheet metal body bent to provide a base portion having a pair of tongues pressed out of the material of said base and return bent flanges overlying said tongues, and an adjoining base portion having a return bent cooperating spring arm.

GEORGE A. TINNERMAN.

REFERENCES CITED

The following references are of record in the file of this patent:

UNITED STATES PATENTS

| Number | Name | Date |
|---|---|---|
| 366,790 | Orther | July 19, 1887 |
| 2,005,948 | Mitchell | June 25, 1935 |
| 2,328,360 | Rigoulot | Aug. 31, 1943 |

FOREIGN PATENTS

| Number | Country | Date |
|---|---|---|
| 550,888 | Great Britain | Jan. 28, 1943 |